(12) United States Patent
Sugimoto et al.

(10) Patent No.: US 10,670,127 B2
(45) Date of Patent: Jun. 2, 2020

(54) TRANSAXLE

(71) Applicant: KANZAKI KOKYUKOKI MFG. CO., LTD., Amagasaki-shi (JP)

(72) Inventors: Hiroshi Sugimoto, Amagasaki (JP); Nobuhiro Shimobayashi, Amagasaki (JP); Toshifumi Yasuda, Amagasaki (JP); Takehiro Oota, Amagasaki (JP); Daisuke Murashima, Amagasaki (JP)

(73) Assignee: KANZAKI KOKYUKOKI MFG. CO., LTD., Amagasaki-shi, Hyogo (JP)

( * ) Notice: Subject to any disclaimer, the term of this patent is extended or adjusted under 35 U.S.C. 154(b) by 505 days.

(21) Appl. No.: 15/672,751

(22) Filed: Aug. 9, 2017

(65) Prior Publication Data
US 2017/0335938 A1    Nov. 23, 2017

Related U.S. Application Data

(63) Continuation-in-part of application No. 14/683,864, filed on Apr. 10, 2015, now Pat. No. 9,759,310.

(51) Int. Cl.
| | |
|---|---|
| *F16H 47/02* | (2006.01) |
| *B60K 17/10* | (2006.01) |
| *F16H 57/027* | (2012.01) |
| *F16H 57/04* | (2010.01) |
| *F16H 57/02* | (2012.01) |

(52) U.S. Cl.
CPC .......... *F16H 47/02* (2013.01); *B60K 17/105* (2013.01); *F16H 57/02* (2013.01); *F16H 57/027* (2013.01); *F16H 57/0457* (2013.01)

(58) Field of Classification Search
CPC .... F16H 47/02; F16H 57/0457; B60K 17/105
USPC ....................................................... 74/730.1
See application file for complete search history.

(56) References Cited

U.S. PATENT DOCUMENTS

| | | | | |
|---|---|---|---|---|
| 5,259,194 A | * | 11/1993 | Okada | B60K 17/14 475/83 |
| 5,440,951 A | * | 8/1995 | Okada | B60K 17/105 475/159 |
| 5,809,845 A | * | 9/1998 | Shimizu | B60K 17/105 74/606 R |
| 6,233,929 B1 | * | 5/2001 | Okada | F16H 39/14 60/456 |
| 6,341,489 B1 | * | 1/2002 | Iida | F16D 31/02 60/487 |
| 6,619,038 B2 | | 9/2003 | Takada et al. | |
| 7,337,611 B2 | | 3/2008 | Sakikawa | |
| 7,621,353 B2 | | 11/2009 | Ishii et al. | |
| 7,762,154 B2 | * | 7/2010 | Murakami | F16H 3/006 74/331 |
| 7,971,435 B2 | | 7/2011 | Sumomozawa et al. | |
| 8,250,862 B1 | | 8/2012 | Iida et al. | |

(Continued)

*Primary Examiner* — Ha Dinh Ho
(74) *Attorney, Agent, or Firm* — Sterne, Kessler, Goldstein & Fox P.L.L.C.

(57) ABSTRACT

A transaxle comprises a hydrostatic transmission (hereinafter, "HST"), an axle, a gear train transmitting power from the HST to the axle, a casing carrying the HST, the gear train and the axle and providing a fluid sump. The casing has an air space over the fluid sump of a gear chamber, a breather cap for ventilation of the air space and for an oil cap is installed on a top part of the casing, and a partition plate is installed right under the breather cap and prevents the fluid sup facing directly to the breather cap.

3 Claims, 12 Drawing Sheets

(56) References Cited

U.S. PATENT DOCUMENTS

| | | | |
|---|---|---|---|
| 8,806,864 B2 | 8/2014 | Ishii et al. | |
| 9,441,729 B2 * | 9/2016 | Skogward | F16H 61/32 |
| 9,638,317 B2 * | 5/2017 | Enami | F16H 61/32 |
| 10,113,641 B2 * | 10/2018 | Kang | F16H 19/04 |
| 2015/0007555 A1 | 1/2015 | Saldierna et al. | |

* cited by examiner

TRANSAXLE

CROSS REFERENCE TO RELATED APPLICATION

This application claims priority as a continuation-in-part to U.S. application Ser. No. 14/683,864, filed Apr. 10, 2015, which is hereby incorporated herein in its entirety by reference thereto.

BACKGROUND OF THE INVENTION

Field of the Invention

The invention relates to a transaxle including a hydrostatic transmission (hereinafter "HST").

Related Art

Conventionally, as disclosed in U.S. 2015/0007555 A1, there is a well-known transaxle including a casing that carries an axle and that incorporates an HST and a gear train interposed between the HST and the axle. The HST includes a center section settled on a bottom of the casing via a fluid filter, a vertical axial hydraulic pump mounted on the center section, and a vertically slant axial hydraulic motor mounted on the center section.

A cavity of the casing has front and rear portions. One of the front and rear portions of the cavity serves as an HST chamber accommodating the HST, and the other of the front and rear portions of the cavity serves as a gear chamber accommodating the gear train and the axle. The hydraulic motor having a vertically and fore-and-aft slant axis is extended from the HST chamber into the gear chamber so as to be drivingly connected to the gear train in the gear chamber.

A fluid sump is formed in the gear chamber of the casing. An air space is formed over the fluid sump and a breather cap for ventilation of the air space and for an oil cap is installed on a top part of the casing. At a transaxle like this, rotating gears by movement of the HST scatter oil of the fluid sump and there is a possibility that oil entering into the breather cap leaks out.

SUMMARY OF THE INVENTION

An object of the invention is to provide a transaxle including an HST, configured so as to prevent oil of the fluid sump scattered by movement of the HST from blowing out from the breather cap.

For achieving the object, a transaxle according to the invention comprises an HST, an axle, a gear train and a casing including the gear train and forming a fluid sump. An air space is formed over the fluid sump and a breather cap for ventilation of the air space and for an oil filler cap is installed on a top part of the casing. Also a partition plate is installed right under the breather cap and prevents the fluid sup facing directly to the breather cap.

Therefore, when oil of the fluid sump scattered by the gear train, the oil hits the partition plate and it prevents oils from entering into the breather cap and from blowing out.

Preferably, the partition plate is switchable to an openstate opening right under the breather cap or a close-state closing right under the breather cap.

Therefore, taking the open-state of the partition plate makes easier feeding oil operation.

Preferably, the partition plate has a through hole opened on the partition plate and a blocking part closing the through hole, and the partition plate takes the open-state with the blocking part opening the through hole and the close-state with the blocking part closing the through hole.

Therefore, the partition plate takes the open-state with the blocking part opening the through hole and it allows being an easy structure of the partition plate.

These and other objects, features and advantages of the invention will appear more fully from the following detailed description of the invention with reference to attached drawings.

BRIEF DESCRIPTION OF THE DRAWINGS

FIG. 5 is a perspective sectional view of a portion of a transaxle casing 10 defining an HST chamber 10a.

DETAILED DESCRIPTION OF THE INVENTION

Figure 1:
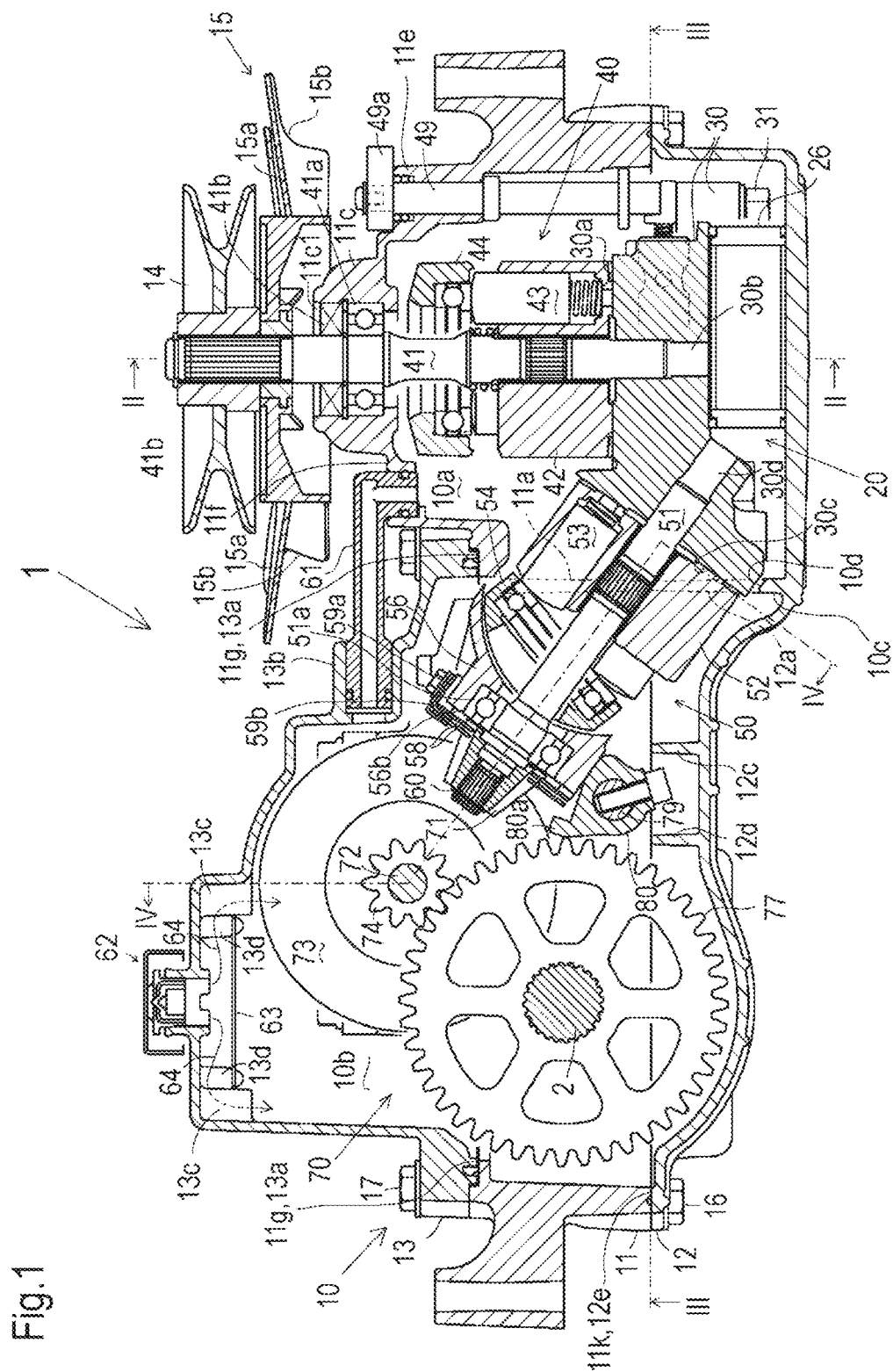
FIG. 1 is a sectional side view of a transaxle 1 of a first embodiment of the invention.

Referring to FIGS. 1 to 6, a transaxle 1 carrying an axle 2 will be described. Transaxle 1 includes a transaxle casing 10, an HST 20 disposed in a front portion of transaxle casing 10, an axle 2 (serving as either a right or left axle of a vehicle) journaled by a rear portion of transaxle casing 10, and a reduction gear train 70 disposed in the rear portion of transaxle casing 10 so as to drivingly connect HST 20 to axle 2. Alternatively, transaxle 1 may be located to have HST 20 in the rear portion thereof and to have reduction gear train 70 and axle 2 in the front portion thereof. However, the following description will be given on the assumption that HST 20 is in the front portion, and reduction gear train 70 and axle 2 in the rear portion.

Transaxle casing 10 includes a main housing 11, a bottom housing 12, and a top housing 13. Main housing 11 and bottom housing 12 abut against each other at a horizontal joint plane P and are fastened together by bolts 16. Main housing 11 is formed at a fore-and-aft middle inside portion thereof with a rib 11a as a plate extended vertically and laterally and joined to right, left and upper side walls of main housing 11. Rib 11a is formed with a downwardly open semicircular recess 11b shaped as an upper half part of a circular hole. Bottom housing 12 is formed at a fore-and-aft middle inside portion thereof with a rib 12a shaped as a vertical and lateral extended plate joined to right, left and bottom side walls of bottom housing 12. Rib 12a is formed with an upwardly open semicircular recess 12b shaped as a lower half part of a circular hole.

Figure 4:
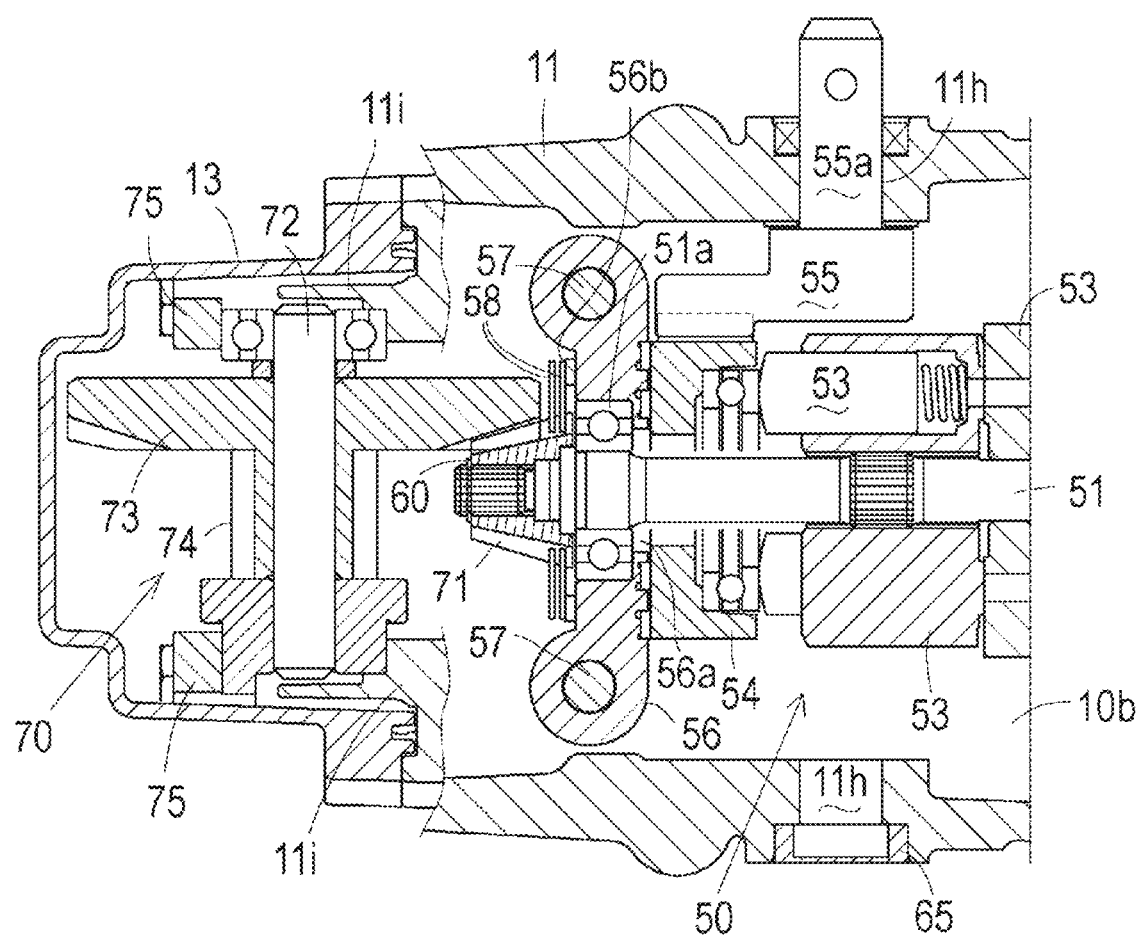
FIG. 4 is a cross sectional view taken along IV-IV arrows of FIG. 1.

Referring to FIGS. 1 and 4, by joining main housing 11 and bottom housing 12 to each other at horizontal joint plane P, a cavity of transaxle casing 10 is formed, and right and left bottom edges of upper rib 11a having semicircular recess 11b therebetween abut against respective right and left top edges of lower rib 12a having semicircular recess 12b therebetween, so that upper and lower ribs 11a and 12a joined to each other serve as a partition wall 10c that divides the cavity of transaxle casing 10 into a front HST chamber 10a and a rear gear chamber 10b. Semicircular recesses 11b and 12b of upper and lower ribs 11a and 12a are joined to each other so as to form a circular opening 10d through which a hydraulic motor 50 of HST 20 is passed as mentioned later.

In this way, the front portion of transaxle casing 10 defines HST chamber 10a accommodating HST 20, and the rear portion of transaxle casing 10 defines gear chamber 10b accommodating speed reduction gear train 70 and axle 2. Partition wall 10c separates HST chamber 10a and gear chamber 10b from each other except that hydraulic motor 50 is passed through opening 10d in partition wall 10c.

The rear portion of main housing 11 defining gear chamber 10b has a top opening 11g at a top thereof, and top housing 13 is fastened by bolts 17 to an edge portion of main housing 11 surrounding top opening 11g so as to cover an upper portion of reduction gear train 70 in gear chamber 10b.

Figure 2:
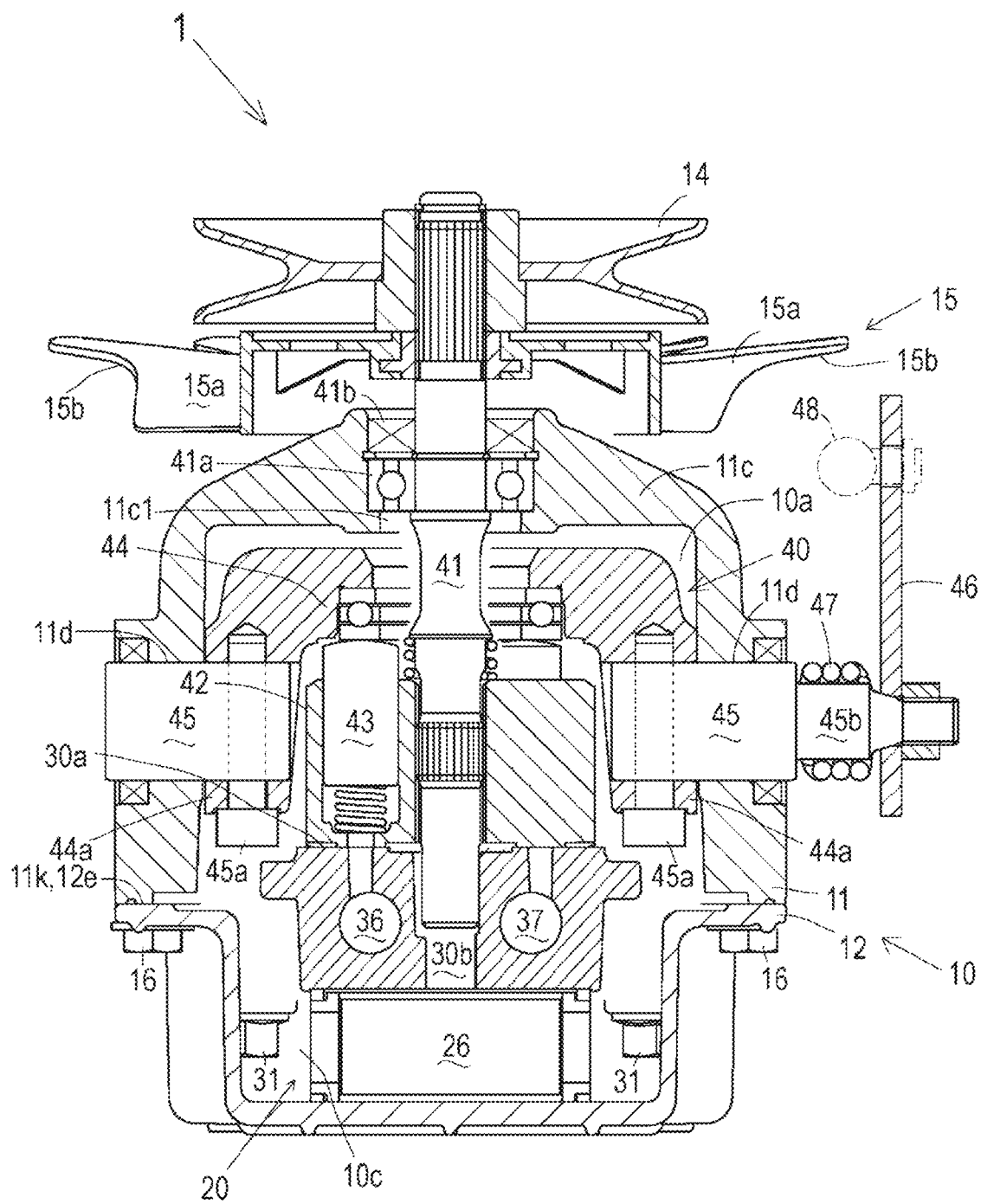
FIG. 2 is a cross sectional view taken along II-II arrows of FIG. 1
Figure 3:
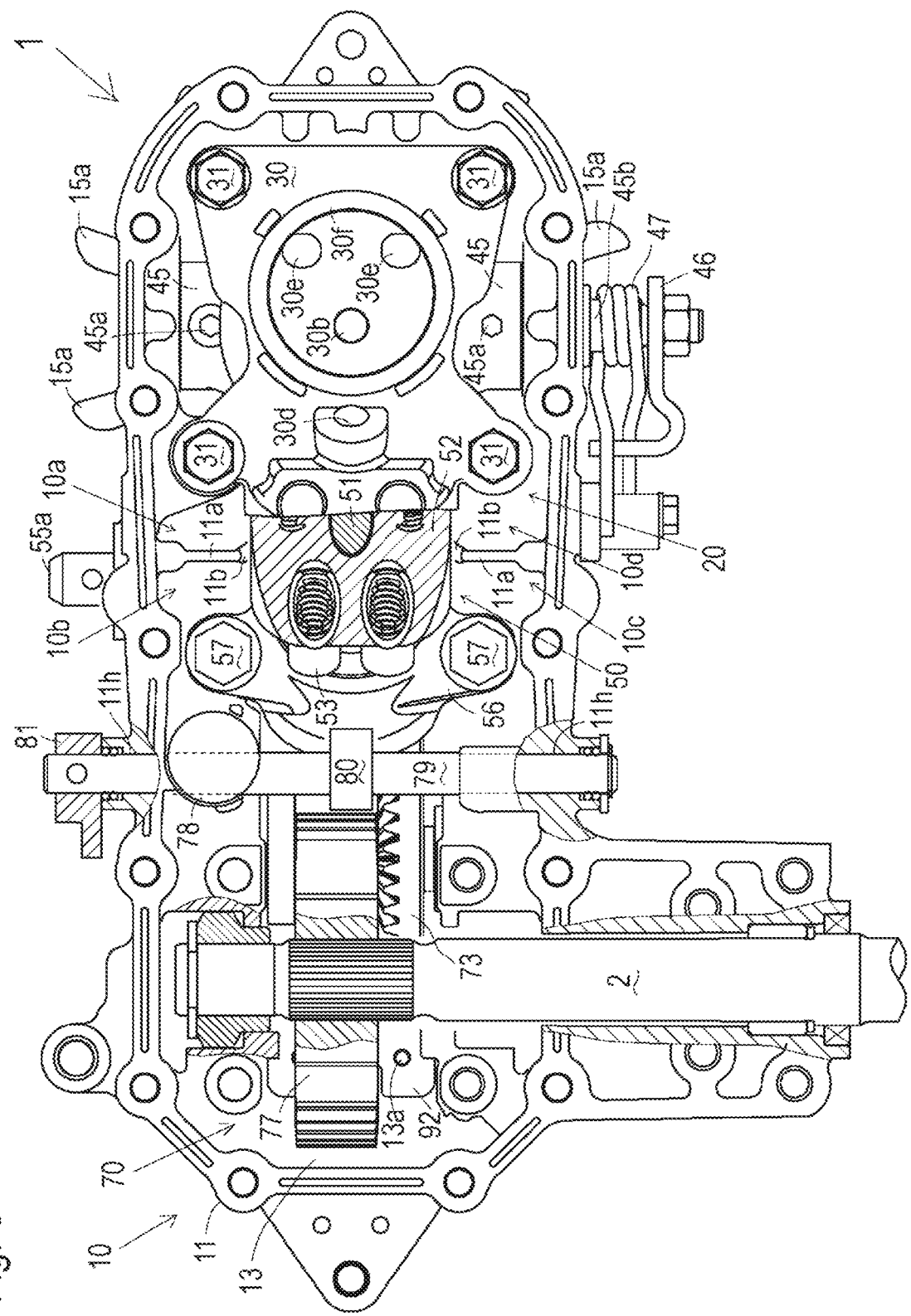
FIG. 3 is a cross sectional view taken along arrows of FIG. 1.

HST 20 includes a center section 30, a hydraulic pump 40, a hydraulic motor 50, and a fluid filter 26. Center section 30 is fastened to main housing 11 by upwardly screwed bolts 31 as shown in FIGS. 1 to 3. Vertically cylindrical fluid filter 26 is placed at a bottom edge thereof on a bottom portion of bottom housing 12, and abuts at a top edge thereof against an annular filter fitting surface 30f formed on a bottom surface of center section 30 as shown in FIG. 3. Fluid filter 26 is submerged in a fluid sump in HST chamber 10a so that fluid is filtered by fluid filter 26 when the fluid penetrates fluid filter 26 from the fluid sump in HST chamber 10a to the inside space of fluid filter 26.

As shown in FIG. 2, right and left main fluid passages 36 and 37 serving as the closed fluid circuit of HST 20 are formed in center section 30 so as to extend in the horizontal fore-and-aft direction. Right and left charge check valves (not shown) are provided in a front portion of center section 30. As shown in FIG. 3, right and left inlet ports 30e connected to the respective charge check valves are open at the bottom surface of center section 30 surrounded by filter fitting surface 30f. The fluid inside fluid filter 26 is introduced into either right or left main fluid passage 36 or 37 via inlet port 30e and the corresponding charge check valve, thereby supplementing the closed fluid circuit of HST 20 with hydraulic fluid.

In this regard, another fluid sump is provided in gear chamber 10b so that a bottom portion of reduction gear train 70 (especially, a later-discussed bull gear 77) is submerged in the fluid sump in gear chamber 10b. An air space is formed over the fluid sump of the gear chamber. Rotating gears of reduction gear train 70 agitate or splash fluid of the fluid sump in gear chamber 10b. The fluid agitated or splashed by the gears tends to be contaminated with air, which may spoil the hydraulic activation of HST 20 if the fluid contaminated with air is mixed into the fluid sump in HST chamber 10a and is introduced into the closed fluid circuit of HST 20 via fluid filter 26 and the charge check valve. Therefore, partition wall 10c obstructs a flow of fluid from the fluid sump in gear chamber 10b to the fluid sump in HST chamber 10a so as to hinder fluid contaminated with air caused by reduction gear train 70 in gear chamber 10b from being mixed into the fluid sump in HST chamber 10a. In other words, the fluid in gear chamber 10b is able to enter HST chamber 10a via opening 10d along hydraulic motor 50 passed through opening 10d as mentioned later, thereby reducing air mixed in the fluid sump in HST chamber 10a.

Referring to FIGS. 1 to 3, hydraulic pump 40 includes a vertical pump shaft 41, a pump cylinder block 42, plungers 43 and a movable swash plate 44. Vertical pump shaft 41 is fittingly passed through a vertical pump shaft hole 30b of center section 30 rotatably relative to center section 30. Pump cylinder block 42 is slidably rotatably fitted onto a horizontal pump mounting surface 30a formed on a top portion of center section 30 and is fixed on pump shaft 41 projecting upward from pump mounting surface 30a of center section 30. Plungers 43 are vertically reciprocally fitted into respective cylinder bores formed in pump cylinder block 42, thereby constituting axial piston type hydraulic pump 40. Movable swash plate 44 abuts against heads of plungers 43 projecting from pump cylinder block 42.

Figure 5:
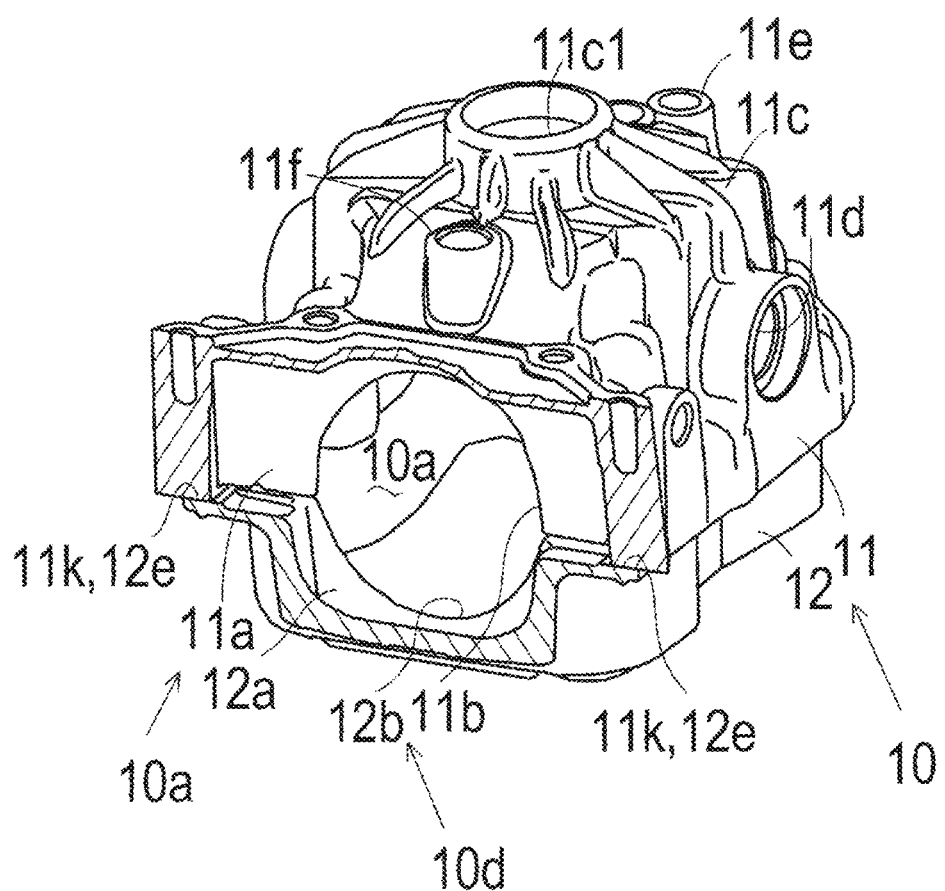

Referring to FIGS. 1, 2 and 5, a front top portion of the ceiling wall of main housing 11 is formed as a pump support portion 11c. Movable swash plate 44 of hydraulic pump 40 is fitted to a ceiling surface of pump support portion 11c slidably rotatably relative to main housing 11. Main housing 11 is formed through right and left side walls of pump support portion 11c with right and left symmetric trunnion holes 11d. Movable swash plate 44 is formed with right and left symmetric feet 44b. Right and left horizontal trunnions 45 are inserted at their proximal portions thereof into respective right and left feet 44a and are fastened to respective feet 44a by respective bolts 45a. Right and left horizontal trunnions 45 are fitted at their distal portions thereof into respective right and left trunnion holes 11d rotatably relative to main housing 11. One trunnion 45 is longer than the other, and a distal end portion 45b of longer trunnion 45 projects outward from main housing 11 and is fixedly provided thereon with a speed control arm 46. A neutral returning spring 47 is wounded around longer trunnion 45 so as to bias movable swash plate 44 and speed control arm 46 toward their neutral position.

Pump support portion 11c is formed with a vertical through hole 11c1. An upper portion of pump shaft 41 projecting upward from pump cylinder block 42 fitted on pump mounting surface 30a of center section 30 is freely passed through movable swash plate 44 fitted to pump support portion 11c and through vertical through hole 11c1 of pump support portion 11c so as to project upward from pump support portion 11c of main housing 11. A bearing 41a and a fluid seal 41b are fitted in through hole 11c1 of pump support portion 11c so as to be interposed between pump shaft 41 and pump support portion 11c of main housing 11.

Figure 7:
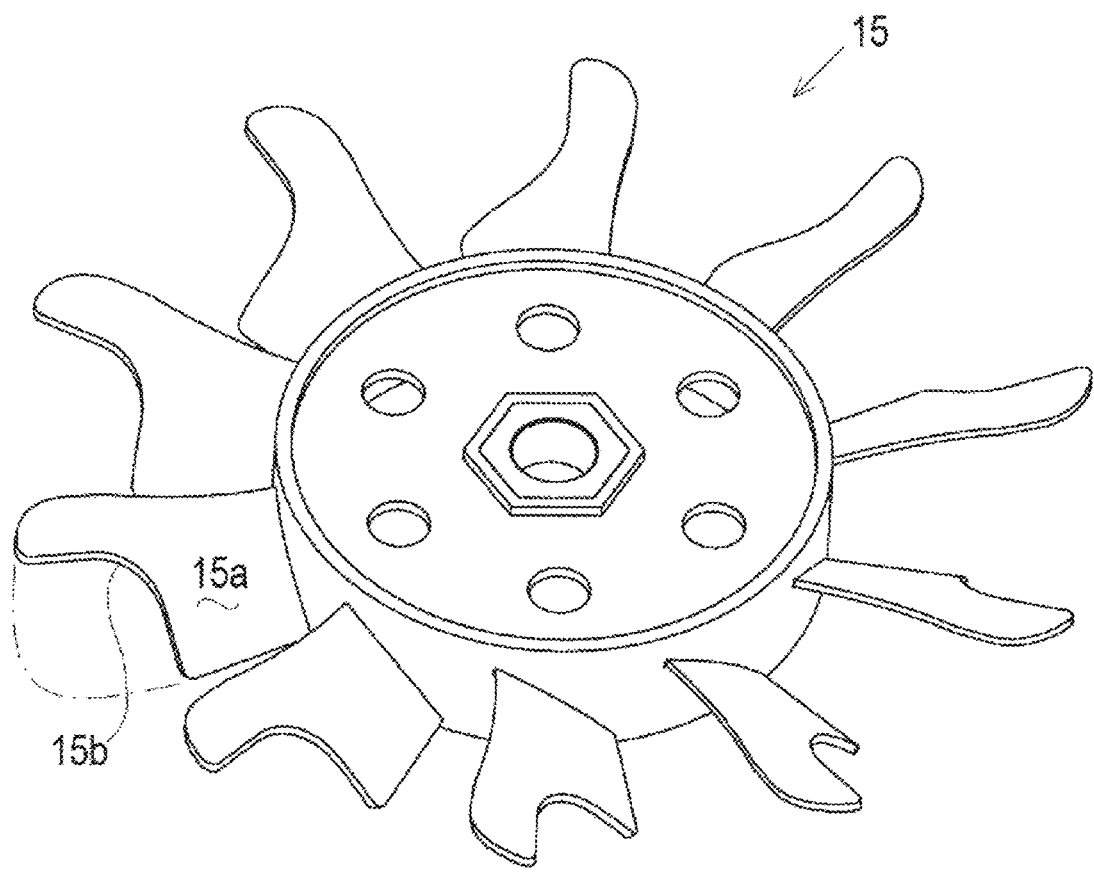
FIG. 7 is a perspective view of a cooling fan 15.

Referring to FIGS. 1 and 2, an input pulley 14 and a cooling fan 15 are fixed on the upper portion of pump shaft 41 projecting upward from pump support portion 11c of transaxle housing 11. An unshown prime mover such as an engine is drivingly connected to input pulley 14 via a belt. Referring to FIGS. 1, 2 and 7, cooling fan 15 is disposed below input pulley 14. Blades 15a of cooling fan 15 are cut off at utmost end portions with curved edges 15b so as to be prevented from interfering with speed control arm 46 or a link member connected to speed control arm 46.

Referring to FIGS. 1 and 5, a boss 11e having a vertical hole is formed at a front portion of pump support portion 11c of main housing 11, and a vertical camshaft 49 is fittingly passed through boss 11e so as to be rotatably centered on its vertical axis. A bypass operation arm 49a is fixed on a top portion of camshaft 49 projecting upward from boss 11f of main housing 11. In HST chamber 10a, a bottom portion of camshaft 48 is formed with a cam for opening the charge check valves. Therefore, when a vehicle having transaxle 1 is towed, bypass operation arm 49a is rotated to rotate camshaft 49 so as to open the charge check valves, thereby releasing fluid from the closed fluid circuit of HST 20, and thereby enabling the towing of the vehicle without resistance of fluid in the closed fluid circuit.

Referring to FIGS. 1, 3 and 4, hydraulic motor 50 is mounted onto a rear portion of center section 30, and is extended rearwardly upward from center section 30. In this regard, center section 30 is formed at a rear portion thereof with a rearwardly downward slant surface serving as a motor mounting surface 30c, and is bored with a motor shaft hole 30d extended forwardly downward from motor mounting surface 30c.

Hydraulic motor 50 includes a motor shaft 51, a motor cylinder block 52, plungers 53 and a movable swash plate 54. Motor shaft 51 is fitted into motor shaft hole 30d of center section 30 rotatably relative to center section 30. Motor cylinder block 52 is slidably rotatably fitted onto motor mounting surface 30c of center section 30, and is fixed on motor shaft 51 extended rearwardly upward from motor mounting surface 30c. Therefore, cylinder bores formed in motor cylinder block 52 are fluidly connected to the cylinder bores in pump cylinder block 42 via main fluid passages 36 and 37 serving as the closed fluid circuit of HST 20. Plungers 53 are fitted into the respective cylinder bores in motor cylinder block 52 reciprocally in the axial direction of motor shaft 51, thereby constituting axial piston type hydraulic motor 50.

Motor shaft 51 and motor cylinder block 52 fixed on motor shaft 51 are extended rearwardly upward from motor mounting surface 30c of center section 30, and are passed through opening 10d in partition wall 10c between HST chamber 10a and gear chamber 10b. Therefore, in gear chamber 10b, an upper portion of motor shaft 51 projects rearwardly upward from motor cylinder block 52 so as to be drivingly connected to reduction gear train 70, as detailed later. An inner peripheral edge of partition wall 10c defining opening 10d approaches an outer peripheral surface of motor cylinder block 52 passing through opening 10d as much as possible so as to further surely partition HST chamber 10a from gear chamber 10b, thereby further restricting the flow of fluid between HST chamber 10a and gear chamber 10b via only opening 10d.

The advantage of hydraulic motor 50 having the slant axis with regard to the vertical axis of hydraulic pump 40 is to horizontally and vertically minimize a portion of transaxle 1 incorporating hydraulic motor 50 while ensuring the sufficient length of motor shaft 51 and the sufficient capacity of motor cylinder block 52. Therefore, the dimension of transaxle 1 in the fore-and-aft direction between pump shaft 41 serving as the input shaft of transaxle 1 and axle 2 serving as the output shaft of transaxle 1 is shortened to facilitate the mounting of transaxle 1 on a small vehicle. In this embodiment, the fore-and-aft middle portion of transaxle casing 10 incorporating hydraulic motor 50 between the front portion of transaxle casing 10 incorporating hydraulic pump 40 and the rear portion of transaxle casing 10 incorporating reduction gear train 70 is shortened in the fore-and-aft direction so as to reduce the entire fore-and-aft length of transaxle 1, and is lowered at the top portion thereof so as to reduce the height of the fore-and-aft middle portion of transaxle 1.

Referring to FIGS. 1, 3 and 4, a motor support member 56 is disposed in a front portion of gear chamber 10b, and is fastened to main housing 11 by bolts 57. Movable swash plate 54 is rotatably and slidably fitted to motor support member 56 and abuts against heads of plungers 53 projecting from motor cylinder block 52. A rear portion of main housing 11 rearward from pump support portion 11c has a top opening 11g defining gear chamber 10b therebelow. Further, main housing 11 is formed through right and left side walls thereof with right and left symmetric trunnion holes 11h below top opening 11g. Movable swash plate 54 is fixed at either a right or left end thereof to a trunnion arm 55. A trunnion shaft 55a projects horizontally from trunnion arm 55 and is fitted into one of right and left trunnion holes 11h rotatably relative to main housing 11. In this regard, either the right or left side of movable swash plate 54 can be optionally selected to have trunnion arm 55 attached thereto, and either right or left trunnion hole 11h can be selected in correspondence to the selected position of trunnion arm 55. Remaining trunnion hole 11h is plugged by a cap 65 as shown in FIG. 4.

An operation lever may be fixed on a distal end portion of trunnion shaft 55a projecting outward from transaxle casing 10. This operation lever for controlling movable swash plate 54 of hydraulic motor 50 can be used to adjust an output scale of transaxle 1 in correspondence to an operator's demand.

Motor support member 56 is formed with a rearwardly upward slant through hole 56a. The upper portion of motor shaft 51 projecting rearwardly upward from motor cylinder block 52 fitted on motor mounting surface 30c of center section 30 is freely passed through movable swash plate 54 fitted to motor support member 56, and is passed through hole 56a of motor support member 56 so as to project rearwardly upward from motor support member 56. A bearing 51a is fitted in through hole 56a of motor support member 56 to journal motor shaft 51.

Motor support member 56 is formed with a rearwardly downward slant flat surface 56b, and a tip portion of motor shaft 51 projects rearwardly upward from flat surface 56b of motor support member 56. A bevel pinion 71 is fixed on the tip portion of motor shaft 51. More specifically, bevel pinion 71 is spline-fitted on the tip portion of motor shaft 51, and a clip 60 is engaged on the tip portion of motor shaft 51 so as to hinder bevel pinion 71 from sliding rearwardly upward along motor shaft 51. Brake discs 58 are disposed parallel to flat surface 56b of motor support member 56, and are engaged onto a bottom portion of bevel pinion 71 close to flat surface 56b so as to be unrotatable relative to bevel pinion 71 and so as to be slidable on bevel pinion 71 in the axial direction of motor shaft 51. A retainer 59 is fixed on motor support member 56 so as to restrict the slidable range of brake discs 58 while allowing brake discs 58 to rotate together with bevel pinion 71. Retainer 59 prevents brake discs 58 from moving to disengage from bevel pinion 71, and clip 60 prevents bevel pinion 71 from moving to disengage from brake discs 58.

Referring to FIG. 3, right and left symmetric shaft holes 11j are formed through right and left side walls of main housing 11, and a laterally horizontal locking shaft 79 is supported at right and left end portions thereof through right and left shaft holes 11j rotatably relative to main housing 11. Either the right or left end of locking shaft 79 projecting outward from main housing 11 is selected to have a parking brake arm 78 fixed thereon.

In gear chamber 10b, a locker arm 80 is fixed on locking shaft 79. A tip portion of locker arm 80 is formed with a pawl 80a to be pressed against brake discs 58. Locker arm 80 is formed with detent surfaces 80b and 80c having different angles. When parking brake arm 78 is located at an unbraking position, detent surface 80b contacts motor support member 56 so as to locate pawl 80a separate from brake discs 58 as shown in FIG. 3, thereby allowing rotation of bevel pinion 71 with brake discs 58. When parking brake arm 78 is located at a braking position, detent surface 80c contacts motor support member 56 so as to locate pawl 80a pressed against brake discs 58, thereby braking bevel pinion 71 together with brake discs 58.

As shown in FIGS. 1, 3 and 5, a laterally horizontal gear shaft 72 is disposed in gear chamber 10b adjacent to the fore-and-aft middle portion of top opening 11g and is journaled at right and left ends thereof by right and left brackets 11i formed on main housing 11. A bevel gear 73 formed with a spur pinion 74 is fixed on gear shaft 72. Bevel gear 73 meshes with bevel pinion 71 fixed on the tip portion of motor shaft 51. An axial boss of bevel gear 73 extended along gear shaft 72 serves as spur pinion 74. A spur bull gear 77 is fixed on axle 2 supported by transaxle housing 11 and meshes with spur pinion 74. Therefore, bevel pinions 71, bevel gear 73, spur pinion 74 and spur bull gear 77 constitute reduction gear train 70 for transmitting power from motor shaft 51 of HST 20 to axle 2.

In gear chamber 10b, when viewed in side, a triangular space is provided between rearwardly upward extended hydraulic motor 50 and bull gear 77, and is used to locate locking shaft 79 and locker arm 80. Further, in this triangular space below locking shaft 79 and locker arm 80, bottom housing 12 is formed with upright ribs 12c and 12d extended upward from a bottom portion of bottom housing 12 and laterally to join at right and left ends thereof to right and left side walls of bottom housing 12. Ribs 12c and 12d serve as dams for the fluid sump in gear chamber 10b so as to hinder fluid contaminated with air caused by agitation or splashing of fluid with the gears of reduction gear train 70 from flowing to hydraulic motor 50.

Figure 6:
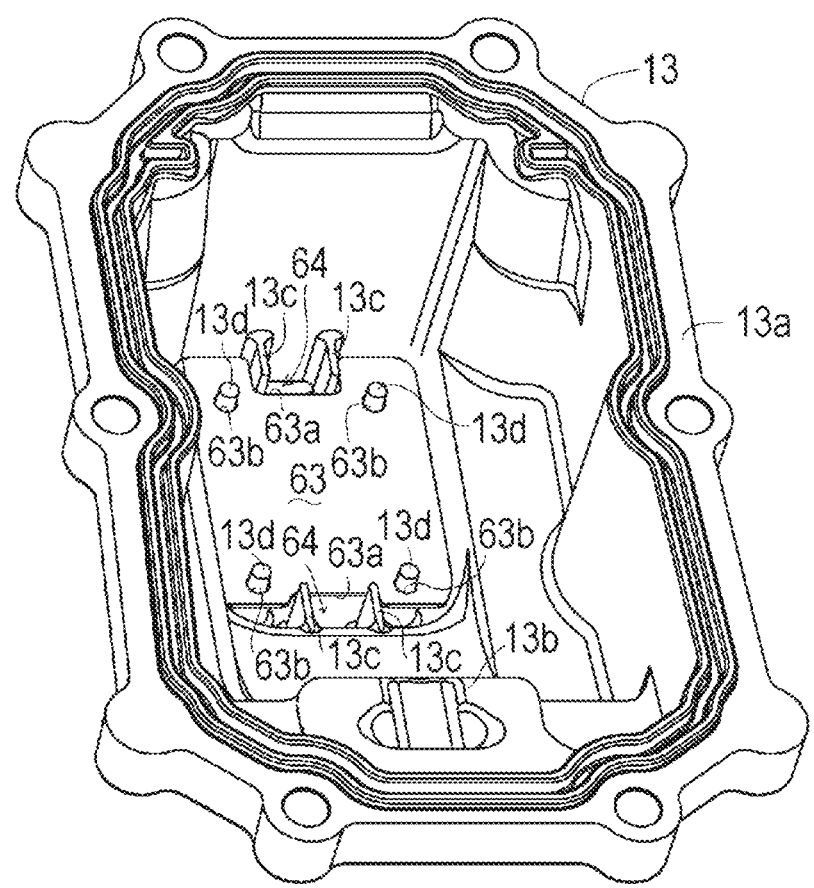
FIG. 6 is a perspective view of a top housing 13 reversed upside down.

Referring to FIGS. 1, 3, 4 and 6, top housing 13 is joined to the rear portion of main housing 11 so as to match its bottom opening 13a with top opening 11g of main housing 11 and so as to cover the upper portion of reduction gear train 70, thereby defining an upper portion of gear chamber 10b. As shown in FIG. 1, a breathing pipe 61 is extended in the fore-and-aft horizontal direction, and is interposed between an upper portion of the front portion of main housing 11 defining HST chamber 10a and a front portion of top housing 13 defining gear chamber 10b. A front end portion of breathing pipe 61 is bent to extend vertically downward, and is fitted into a vertical hole of a boss 11f formed at a rear portion of pump support portion 11c of main housing 11 as shown in FIGS. 1 and 5, so that a downwardly open front end of breathing pipe 61 is open to the upper portion of HST chamber 10a. A rear end portion of breathing pipe 61 is fitted into a fore-and-aft horizontal hole of a boss 13b formed at a front portion of top housing 13 as shown in FIGS. 1 and 6, so that a rearwardly open rear end of breathing pipe 61 is open to the upper portion of gear chamber 10b. Therefore, air heated by activating HST 20 is breathed from HST chamber 10a to gear chamber 10b via breathing pipe 61.

Referring to FIG. 1, a rear top portion of top housing 13 is provided with a breather cap 62 for ventilation of the air space and for an oil cap. Referring to FIGS. 1 and 6, in the upper portion of gear chamber 10b in top housing 13, a partition plate 63 is settled just below breather cap 62 horizontally so as to prevent fluid sump from facing breather cap 62. Partition plate 63 prevents oil scattered by reduction gear train 70 from entering into breather cap 62. In detail, even when oil of the fluid sup is scattered by the gear train of gear chamber 10b, the oil hits partition plate 63 and it prevents oil from entering into the breather cap 62 and from leaking out. Partition plate 63 is, for example, made by a metal plate. As shown in FIG. 6, partition plate 63 is formed with notches 63a at front and rear edges, and ribs 13c formed on top housing 13 to define air passages 64 between gear chamber 10b and breather cap 62 are fittingly passed through front and rear notches 63a of partition plate 63.

Pin holes 63b (in this embodiment, four pin holes 63b) are formed around partition plate 63. Top housing 13 is made of plastic material, and is formed with pins 13d at positions corresponding to respective pin holes 63b. After pins 13d are passed through respective pin holes 63b, tips of pins 13d are squashed by heating so as to prevent partition plate 63 from falling from pins 13d, thereby fixing partition plate 63 to top housing 13.

Figure 8:
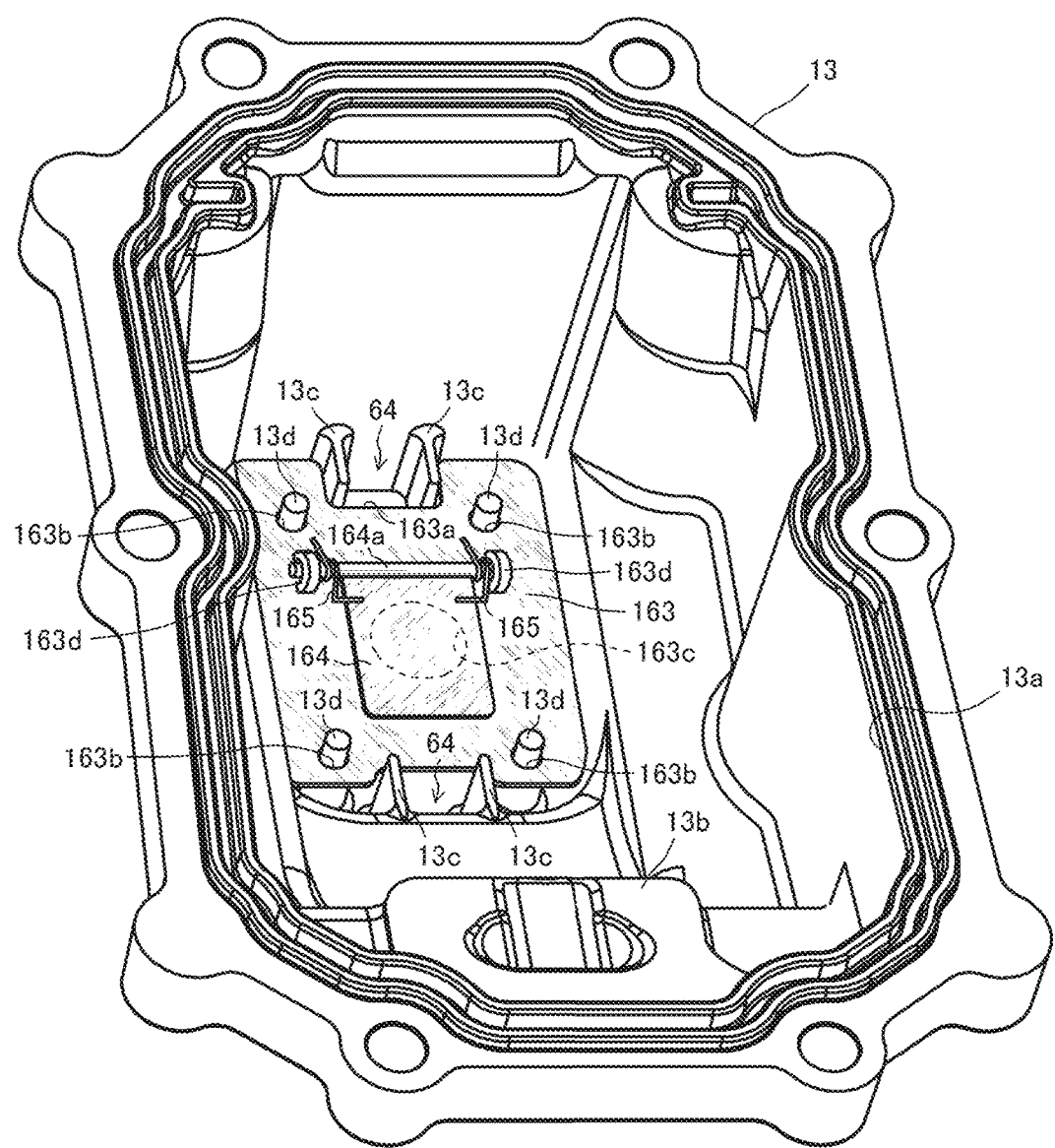
FIG. 8 is a perspective view of a top housing 13 of a second embodiment of the invention reversed upside down.
Figure 9:
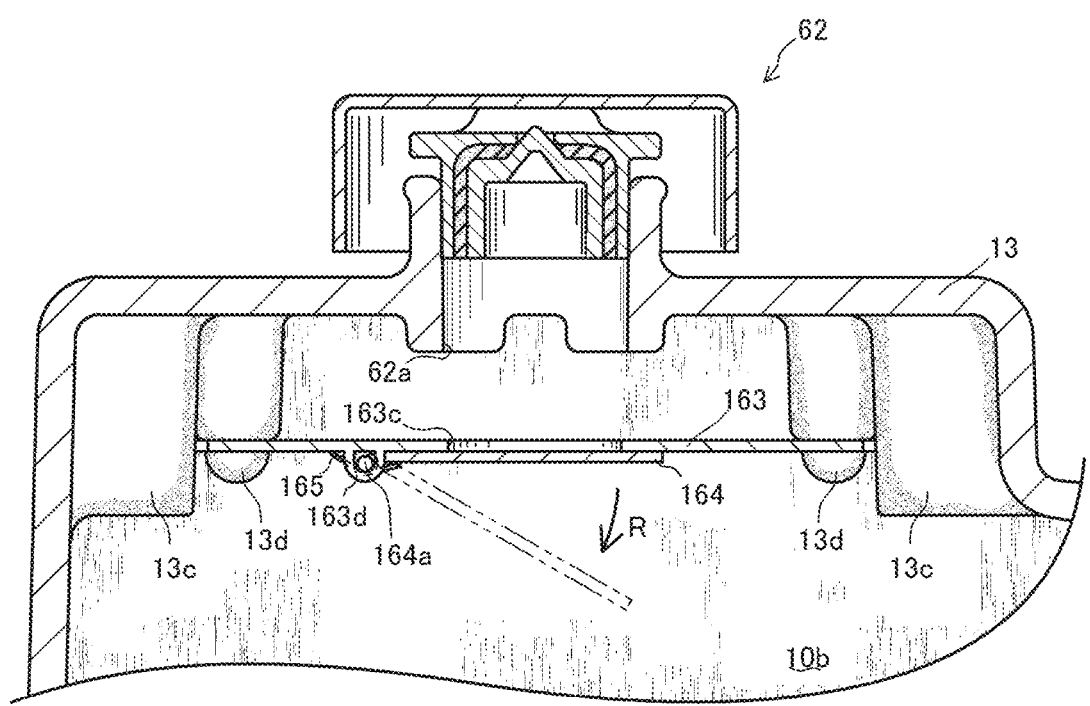
FIG. 9 is an enlarged sectional side view of a top housing 13 of a second embodiment of the invention.

Referring to FIGS. 8 and 9, explanation for partition plate 163 of top housing 13 of a second embodiment of the transaxle is presented. Referring to FIG. 9, breather cap 62 for ventilation of the air space and for an oil cap is installed on a rear end portion which is a top part of top housing 13. Referring to FIGS. 8 and 9, in the upper portion of gear chamber 10b in top housing 13, a partition plate 163 is settled just below breather cap 62 horizontally so as to prevent fluid sump from facing breather cap 62. Partition plate 163, as same with the partition plate 63 of the first embodiment, prevents oil scattered with reduction gear train 70 from entering into breather cap 62. As shown in FIG. 8, partition plate 163 is formed with notches 163a at front and rear edges, and ribs 13c formed on top housing 13 to define air passages 64 between gear chamber 10b and breather cap 62 are fittingly passed through front and rear notches 163a of partition plate 163.

In this embodiment also as shown in FIG. 9, after pins 13d are passed through respective pin holes 163b, tips of pins 13d are squashed by heating so as to prevent partition plate 163 from falling from pins 13d, thereby fixing partition plate 163 to top housing 13.

In this embodiment, partition plate 163 is switchable to an open-state opening right under breather cap 62 or a close-state closing right under breather cap 62. In detail, a through hole 163c is opened through partition plate 163 right under breather cap 62. Then a blocking plate 164 able to close through hole 163c is installed on partition plate 163.

On one end of blocking plate 164, a rotation shaft 164a having wider length than the width of blocking plate 164 is fixed on blocking plate 164. Both end of rotation shaft 164a is rotatably supported with a supporting part 163d on the bottom surface of partition plate 163. Thus blocking plate 164 is rotatable under partition plate 163 and is able to open or close through hole 163c. Blocking plate 164 is applied a force toward the bottom surface of partition 163 with a torsion spring 165. Then blocking plate 164 closes through hole 163c while oil is not fed.

In partition plate 163, described above, when an operator puts off breather cap 62 and feeds oil into an oil supply port 62a, as shown by arrow R in FIG. 9, blocking plate 164 of partition plate automatically rotates with the weight of oil. Thus, while oil is fed, as shown by a two dot dash line in FIG. 9, blocking plate 164 opens through hole 163c and partition plate 163 makes up and down spaces into openstate. Also while oil not fed, as shown by solid line in FIG. 9, blocking plate 164 closes through hole 163c and partition plate 163 makes close-state.

Thus, in this embodiment, partition palate 163 is switchable to an open-state opening right under breather cap 62 or a close-state closing right under breather cap 62. Then taking the open-state of partition plate 163 allows of easy oil feeding operation. In this embodiment, open/close of partition plate 163 is selected by blocking plate 164, however it is possible to change to open-state where space right under breather cap 62 is opened and close-state where space right under breather cap 62 is closed by rotating.

Figure 10:
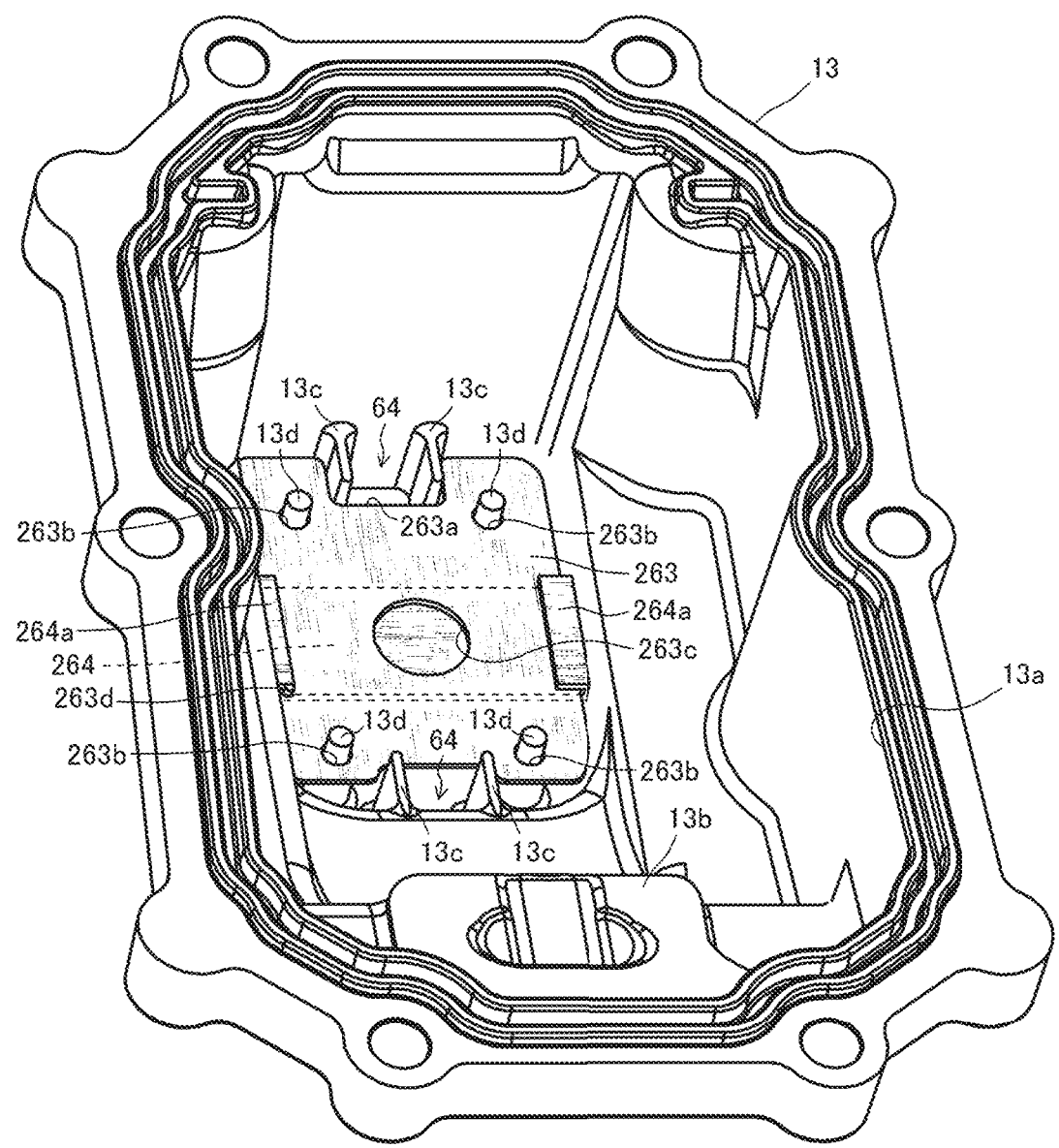
FIG. 10 is a perspective view of a top housing 13 of a third embodiment of the invention reversed upside down.
Figure 11:
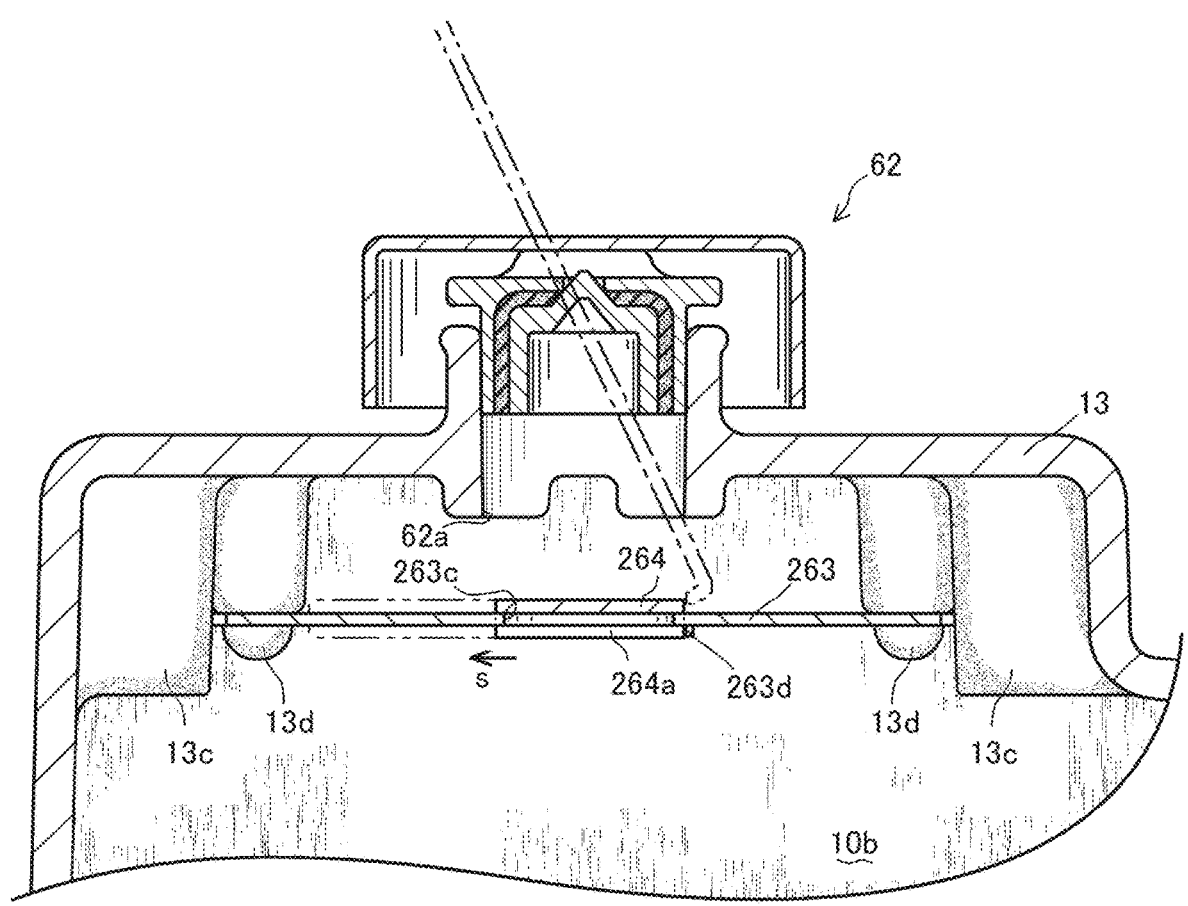
FIG. 11 is an enlarged sectional side view of a top housing 13 of a third embodiment of the invention.

Referring to FIGS. 10 and 11, explanation for partition plate 263 of top housing 13 of a third embodiment of the transaxle is presented. As shown in FIG. 11, partition plate 263 located right under breather cap 62 prevents oil scattered with reduction gear train 70 from entering into breather cap 62 as like partition plate 63 of the first embodiment.

In this embodiment, partition plate 263 is switchable to an open-state opening right under breather cap 62 or a close-state closing right under breather cap 62. In detail, a through hole 263c is opened through partition plate 263 right under breather cap 62. Then a blocking plate 264 able to close through hole 263c is installed on partition plate 263.

Blocking plate 264 which is a long rectangle plate shape has bended parts 264a on both ends and bended parts 264a hook edges of partition plate 263. Thus blocking plate 264 is slidably movable along with partition plate 263 and is able to open or close through hole 263c. For open blocking plate 264, operator moves blocking plate 264 by inserting a rod-like special tool (shown as one dot dash lines in FIG. 11) through oil supply port 62a. In addition, a pin 263d is installed on partition plate 263 for positioning partition plate 263 at the close-state, otherwise it may be useful to engage a convex part made on partition plate 263 with a small hole made on blocking plate 264 for keeping blocking plate 264 on closing position. Also blocking plate 264 may have a projected part toward upside for closing through hole 263c with the rod-like special tool, e.g. making an additional bended part projecting upside from blocking plate 264 for hooking.

In partition plate 263 as described above, when an operator takes off breather cap 62 and feeds oil through the oil supply port, as shown in FIG. 11, the operator slides blocking plate 264 toward the direction of the allow S as two dot dash lines in FIG. 11 and makes partition plate 263 open-state with opening through hole 263c. Also when oil is not fed i.e. normal situation, as solid lines shown in FIG. 11, blocking plate 264 closes through hole 263c and partition plate 263 is made close-state.

Thus, in this embodiment, partition plate 263 is switchable to an open-state opening right under breather cap 62 or a close-state closing right under breather cap 62. Then taking the open-state of partition plate 263 allows of easy oil feeding operation into top housing 13.

In addition, in this embodiment, blocking plate 264 is slidably movable along with partition plate 263, also it is possible that blocking plate takes arc movement around through hole 263c. Thus a rotation shaft is provided in the direction orthogonal against partition plate 263 and inserted into an outer portion of the blocking plate for rotating the blocking plate around the rotation shaft, and it makes open/close through hole 263c. Also in this case, an operator moves blocking plate 264 by inserting a rod-like special tool through oil supply port 62a.

Figure 12:
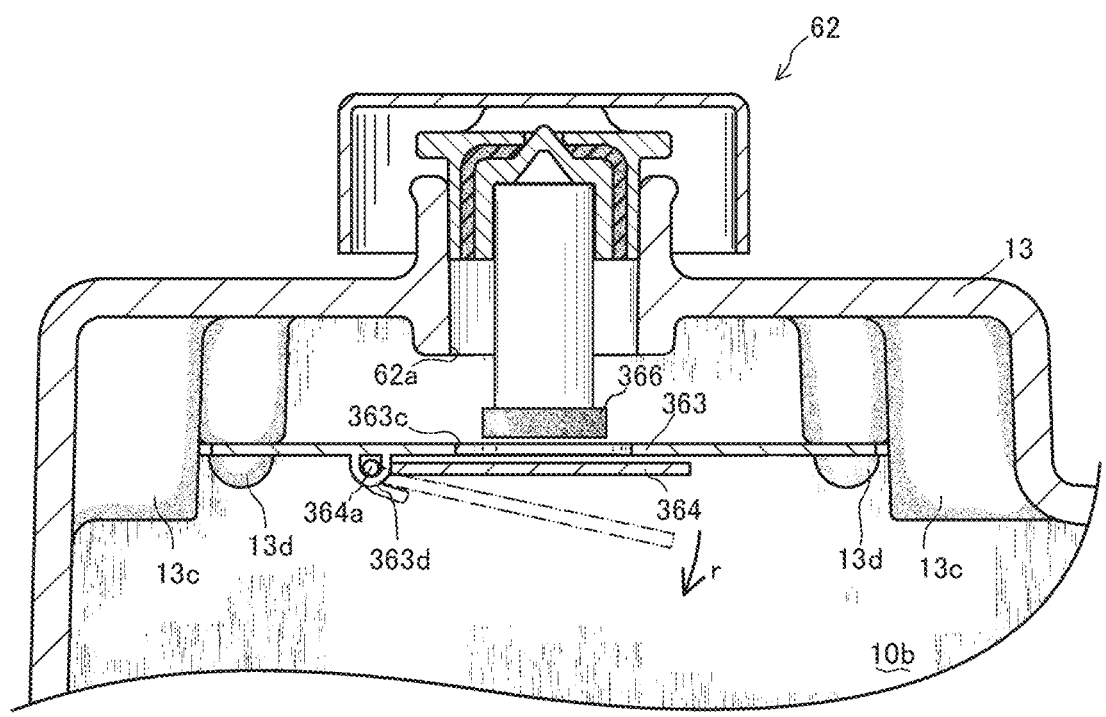
FIG. 12 is an enlarged sectional side view of a top housing 13 of a fourth embodiment of the invention.

Referring to FIG. 12, explanation for partition plate 363 of top housing 13 of a third embodiment of the transaxle is presented. As shown in FIG. 12, partition plate 363 is switchable to an open-state opening right under breather cap 62 or a close-state closing right under breather cap 62. In detail, a through hole 363c is opened through partition plate 363 right under breather cap 62. Then a blocking plate 364 able to close through hole 363c is installed on partition plate 363.

On blocking plate 364, rotation shaft 364a is fixed. Rotation shaft is rotatably supported within a certain angle range against supporting part 363 formed on one end part of partition plate 363. Thus, blocking plate 364 is rotatable against partition plate 363 and it allows through hole 363c to open/close. Blocking plate 364 is made of a sheet metal, magnetic material like steel. Breather cap 62 mounts a magnet supporting part in center of inside, the magnet supporting part is extended toward partition plate 363 and has magnet 366 on the bottom end.

While breather cap 62 is attached, magnet 366 keeps blocking plate 364 with a position shown in Figs. by attractive force thereof via through hole 363c.

In partition plate 363, described above, when an operator puts off breather cap 62 and feeds oil into an oil supply port 62a, as shown by two dot dash lines in FIG. 12, blocking plate 364 rotates to the direction of allow r with absence of magnetic force of magnet 366, thus through hole 363c is opened and it makes partition plate 363 open-state.

Thus, in this embodiment, partition plate 363 is switchable to an open-state opening right under breather cap 62 or to a close-state closing right under breather cap 62. Then taking the open-state of partition plate 363 allows of easy oil feeding operation. Also in this embodiment, there is no need of using a special tool and exchanging open/close of partition plate 363 is available with simple mechanism.

In addition, in this embodiment, blocking plate 364 is rotated by magnet 366 fixed on breather cap 62, also it is possible to use other mechanisms. For example, it is possible to rotate partition plate 363 itself with two magnets or to slide partition plate 363 or blocking plate 364. Also it is possible to move blocking plate 364 (or partition plate 363) with effect of attractive/repulsive force by turning over one magnet.

What is claimed is:

1. A transaxle comprising:
   a hydrostatic transmission (hereinafter, "HST");
   an axle;
   a gear train transmitting power from the HST to the axle;
   a casing carrying the HST, the gear train and the axle and providing a fluid sump,
   wherein the casing has an air space over the fluid sump of a gear chamber,
   a breather cap for ventilation of the air space and for an oil filler cap is installed on a top part of the casing,
   and a partition plate is installed right under the breather cap and prevents the fluid sump facing directly to the breather cap.

2. The transaxle according to claim 1, wherein the partition plate is switchable to an open-state opening right under the breather cap or to a close-state closing right under the breather cap.

3. The transaxle according to claim 1, wherein the partition plate has a through hole opened on a baffle plate and a blocking part closing the through hole, and
   wherein the blocking part opening the through hole makes the partition plate an open-state.

* * * * *